July 22, 1958  A. EPPINGER ET AL  2,844,681
AUTOMATIC ELECTRIC CUT-OUTS
Filed June 9, 1955  3 Sheets-Sheet 2
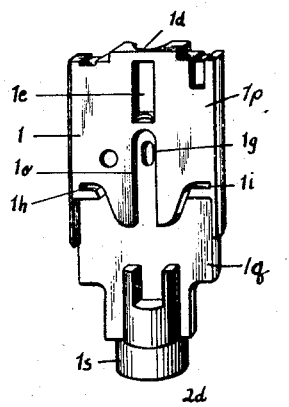
FIG.12
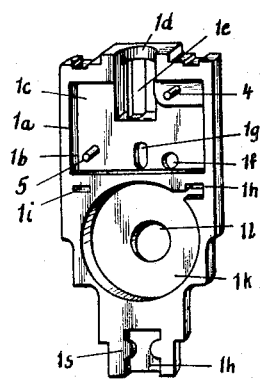
FIG.13
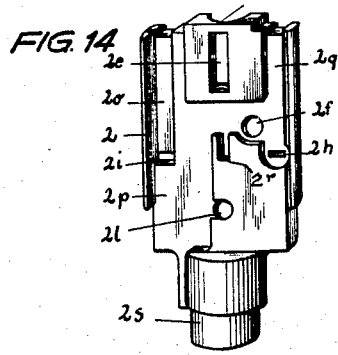
FIG.14  FIG.15  FIG.16
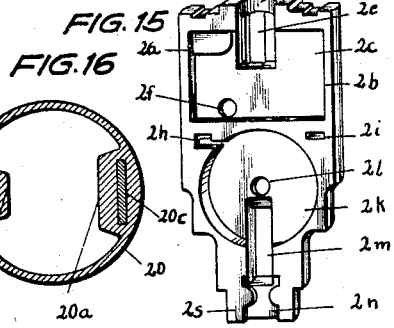
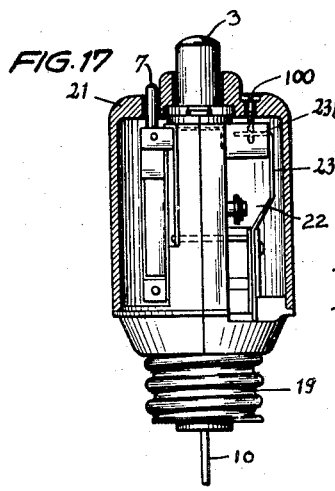
FIG.17
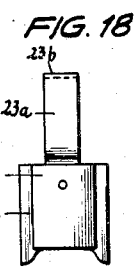
FIG.18
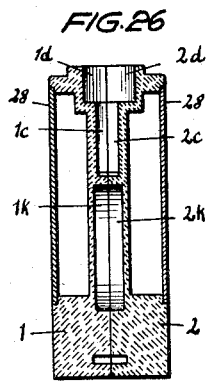
FIG.26
INVENTOR
Alfred Eppinger
Heinrich Busch
by Erwin Salper Atty.

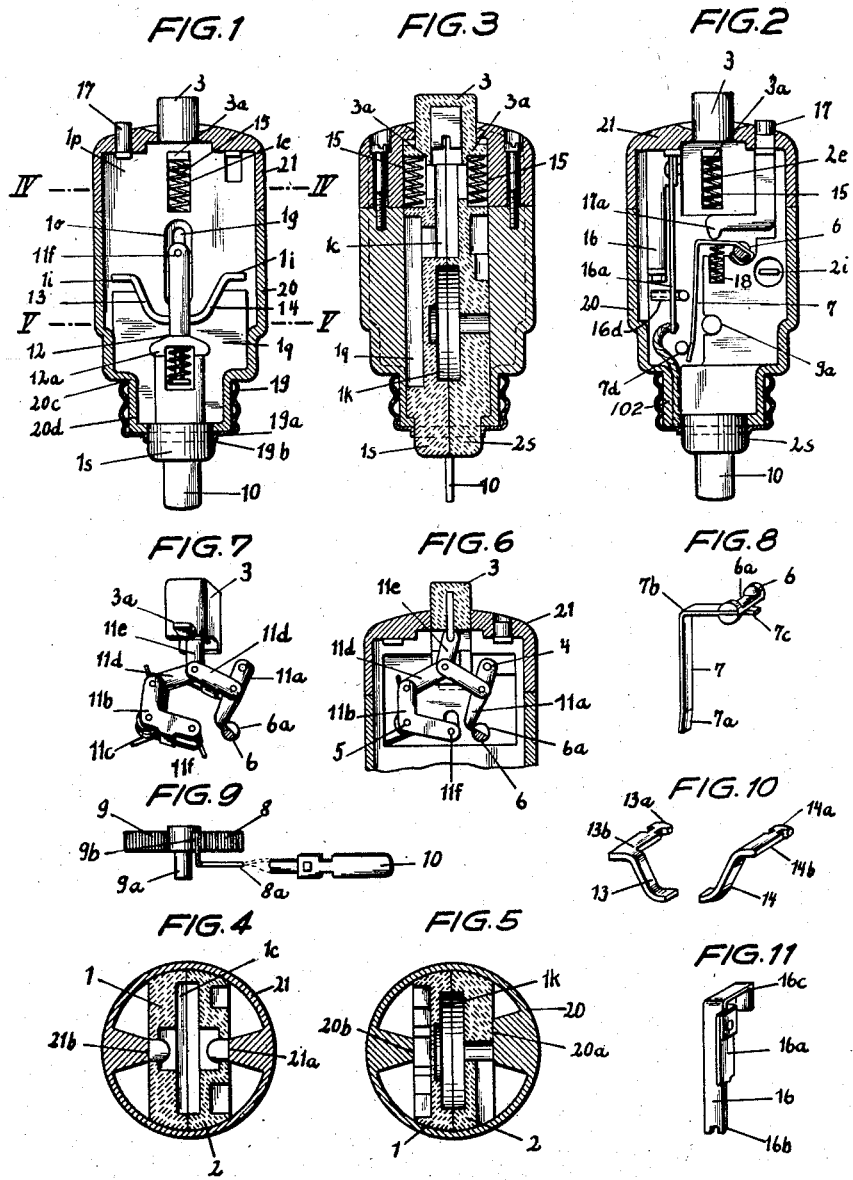

July 22, 1958   A. EPPINGER ET AL   2,844,681
AUTOMATIC ELECTRIC CUT-OUTS
Filed June 9, 1955   3 Sheets-Sheet 3

INVENTOR

United States Patent Office 2,844,681
Patented July 22, 1958

2,844,681

AUTOMATIC ELECTRIC CUT-OUTS

Alfred Eppinger and Heinrich Busch, Ludenscheid, Germany, assignors to Busch-Jaeger Durener Metallwerke Aktiengesellschaft, Ludenscheid, Germany Application June 9, 1955, Serial No. 514,176

Claims priority, application Germany June 10, 1954

19 Claims. (Cl. 200—88)

This invention refers to small circuit breakers or small automatic electric cut-outs, as widely used to automatically interrupt electric circuits on occurrence of a protracted overload of inadmissible duration, or on occurrence of a major fault current in the nature of a short-circuit current.

This invention refers more specifically to automatic protective devices of the aforementioned character as generally used on panelboards in domestic and like installations to protect branch circuits.

It is one of the objects of this invention to provide small circuit breakers whose constituent parts are adapted to be more readily assembled than those of comparable prior art structures, resulting in a drastic reduction of manufacturing cost.

It is another object of the invention to provide small circuit breakers having a frame structure including two complementary abutting portions defining inner and outer chambers accommodating all the constituent parts of the circuit breaker.

It is another object of the invention to provide circuit breakers comprising cooperating contacts, push-button operated toggle mechanisms of the snap action type for said contacts, thermal tripping means, electromagnetic tripping means, and manually operable tripping means all of which are accommodated in cavities defined by two complementary portions of an insulating frame, all of which are held in these cavities in position without special fastener means, or with a minimum of such means, and some of which are arranged on the outer surfaces of the aforementioned insulating frame while others are arranged inside of said insulating frame.

Another object of the invention is to provide small automatic circuit breakers comprising a much smaller number of parts or components than functionally equivalent prior art circuit breakers, and in which the number of fastening means is minimized.

The novel features which are characteristic of the invention are set forth in particular in the appended claims. The invention itself, however, both as to structure and operation together with additional objects and advantages thereof will best be understood from the following detailed description of several preferred embodiments thereof when read in connection with the accompanying drawings, in which, Fig. 1 is substantially a side elevation of a screw plug type automatic circuit breaker or automatic cut-out seen from the arcing chamber side, or switch chamber side thereof, its casing being shown in section;

Fig. 2 is a side elevation of the same structure as shown in Fig. 1 but seen from the opposite side thereof where the trip members are arranged;

Fig. 3 is a central section of the structure shown in Figs. 1 and 2 taken along a plane at right angles to that of Fig. 1 and that of Fig. 2;

Figs. 4 and 5 are cross-sections taken along IV—IV, and V—V, of Fig. 1, respectively;

Fig. 6 is a vertical section through the top portion of the structure shown in Figs. 1 to 3, inclusive, which portion contains the switch or circuit breaker operating mechanism;

Figure 19:
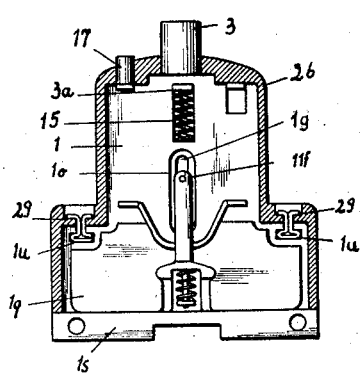
Figure 20:
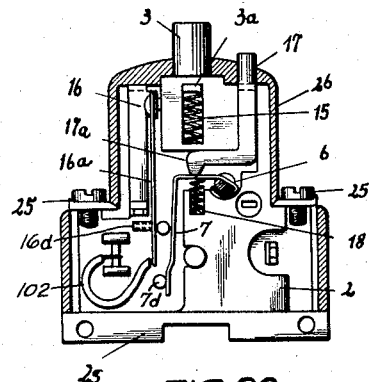
Figure 21:
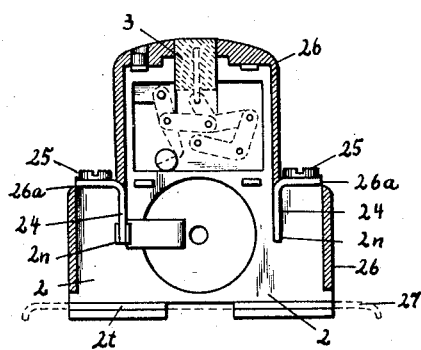
Figure 22:
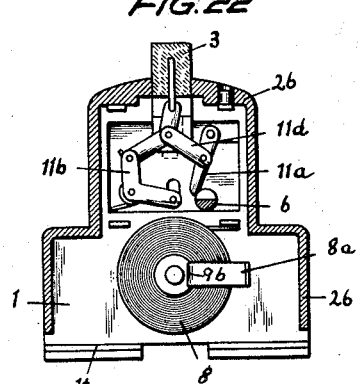
Figure 23:
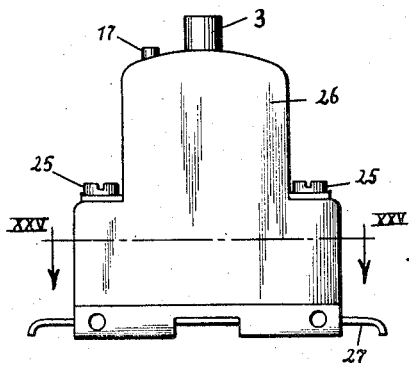
Figure 24:
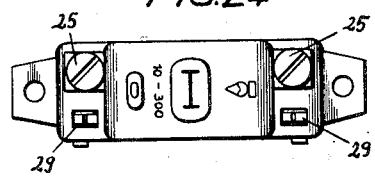
Figure 25:
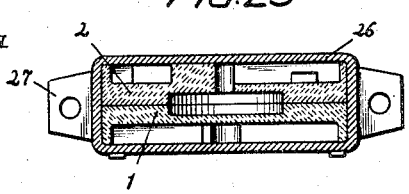

Figs. 7 to 11, inclusive, are isometric views of a number of components of the structure of Figs. 1 to 3;

Figs. 12 to 15, inclusive, are isometric views of both sides of a pair of blocks which are constituent parts of the structure of Figs. 1 to 3;

Fig. 16 refers to a modification of the casing of the structure of Figs. 1 to 3 and shows a modified casing in cross-section;

Fig. 17 illustrates a modified embodiment of the invention taken along a central plane in the same fashion as Fig. 3;

Fig. 18 is a front elevation of a detail of the structure of Fig. 17 seen at right angles to the plane of Fig. 17;

Fig. 19 is a side elevation of another embodiment of the invention the housing thereof being shown in cross-section;

Fig. 20 is a side elevation of the structure of Fig. 19 seen from the opposite side, the housing thereof being shown in cross-section;

Figs. 21 and 22 are side elevations of the structures shown in Figs. 19 and 20, respectively, and show the parts situated inside of the frame structure, the housing for the latter being shown in cross-section in the same fashion as in Figs. 19 and 20;

Fig 23 is a front elevation of the outer housing for the structure of Figs. 19–22;

Fig. 24 is a top plan view of the structure shown in Fig. 23;

Fig. 25 is a cross-section along XXV—XXV of Fig. 23; and

Fig. 26 is a central vertical section through a modified frame structure for a circuit breaker embodying the present invention.

Referring now to the drawings, and more particularly to Figs. 12 to 15 and 1 to 3 thereof, reference numerals 1 and 2 have been applied to designate a pair of juxtaposed insulating members or insulating blocks made of a molded insulating material. The abutting surfaces 1a, 2a of insulating members or insulating blocks 1, 2 are preferably polished to avoid any significant gap formation between these two parts. Blocks 1, 2 are provided with recesses 1b, 2b on the juxtaposed sides thereof. The rear sides of recesses 1b, 2b are closed by the walls or surfaces 1c, 2c. The space or chamber defined by the registering recesses 1b, 2b inside of blocks 1, 2 accommodates a snap action contact operating mechanism (shown in Figs. 6, 21 and 22) of the toggle-lever type (shown in Figs. 6, 21 and 22) to be described below more in detail. Actuating push-button 3 is attached to the aforementioned toggle mechanism and forms an integral part thereof. Recesses 1d, 2d in insulating blocks 1, 2 are adapted to receive push button 3. Push button 3 has lateral pin-like guiding projections 3a forming an integral part thereof and entering into recesses 1e, 2e in blocks 1, 2 wherein they are guided. The aforementioned surfaces 1c, 2c of blocks 1, 2 are provided with holes extending at right angles to these surfaces and adapted to receive two pins 4, 5 supporting the aforementioned snap action contact operating toggle mechanism. A pair of coaxial holes in insulating blocks 1, 2 forms a bearing for supporting a locking pin or latch spindle 6 of the tripping mechanism of the circuit breaker. Locking pin or latch spindle 6 is provided with a radial slot into which one end of one arm of bell-crank-shaped tripping armature 7 is inserted (see Figs. 2 and 8). The perforation 1g in insulating block 1 connects the internal chamber formed by recesses 1b, 2b with an external switch or arcing chamber 1q to be described below (Figs. 1 and 12). Block 1 is provided with recesses 1h, 1i and block 2 is provided with recesses 2h, 2i registering with recesses 1h, 1i when blocks 1, 2 are arranged in their abutting positions, as shown in Figs. 1 to 3, inclusive. The recesses 1h, 1i, 2h, 2i are intended to receive and to support a pair of stationary contacts 13, 14 adapted to cooperate with a movable contact bridge 12a attached to the lower end of movable contact operating insulating rod 12. The latter is adapted to be operated by push button 3 by the intermediary of the aforementioned toggle mechanism to which it is attached by pin 11f. Substantially cylindrical recesses 1k, 2k in the abutting surfaces of insulating blocks 1, 2 accommodate a pancake tripping coil 8 wound from a conductor in strip form. Coil 8 is intended to establish the magnetic field for operating the aforementioned tripping armature 7. The base surface of recess 1k is provided with a central hole 1l receiving one end of magnet core 9. Core 9 has a tapered end 9a which projects through a hole 2l in block 2 to the region where pivotable armature 7 is located. Groove 2m receives the inner end 8a of tripping coil 8, and the central external terminal 10 (see Fig. 9) is conductively connected to end 8a of coil 8. It will be noted that coil end 8a is bent at 45 deg. and extends in the direction of the axis of core 9. Blocks 1, 2 are provided with registering grooves 1n, 2n which receive the external terminal contact 10 and firmly hold or clamp that terminal contact in the position. The portion 9b of core 9 remote from its outwardly projecting end 9a is chamfered.

As best shown in Figs. 6 and 7 the push button 3 for operating the toggle mechanism situated below the push button 3 is substantially T-shaped, i. e. it comprises a button body 3 proper and the two aforementioned lateral guiding projections 3a guided in recesses 1e, 2e. The snap action toggle operating mechanism is supported by merely two pins 4, 5. This toggle mechanism comprises the locking or latching lever 11a pivoted at 4 adapted to enter a groove 6a in locking or latching spindle 6, driving lever 11b to the lower end of which contact operating rod 12 is attached by pin 11f and rat-trap resetting spring 11c. Levers 11a, 11b are operated by a pair of toggle links 11d and a rocking lever 11e pivotally attached to push button 3. Push button 3 is acted upon by a pair of helical springs 15 resting upon the lateral projections 3a thereof and accommodated in recesses 1e, 2e in insulating blocks 1, 2. Insulating rod 12 is guided in a longitudinal groove 1o provided in external surface 1p of block 1, which groove is situated above fixed contacts 13, 14. Surface 1p is substantially flat and contacts 13, 14 are arranged close to the top of arcing chamber 1q (Figs. 1 and 12).

The operation of the above described toggle mechanism is as follows: When push button 3 is depressed or pushed downwardly, the bottom end of locking or latching lever 11a is being latched in position and lever 11b moves insulating switch rod 12 upwardly. This causes engagement of the movable contact bridge 12a with fixed contacts 13, 14. The snap action operating mechanism and contact bridge 12a then remain in closed position until one of the trip members of the mechanism responds to an excessive flow of current in the circuit to be protected, or until the circuit breaker is being tripped manually by a tripping push button 17 to be described below more in detail. In case of excessive current flow latching spindle 6 is pivoted, allowing latching lever 11a to escape into groove 6a. This causes the snap action operating mechanism to collapse, and contact operating rod 12 to be moved to the open position under the action of rat-trap spring 11c. When lever 11a is being unlatched and the toggle operating mechanism caused to collapse, push button 3 is allowed to return under the bias of springs 15 to its initial or open position.

The external surfaces of blocks 1, 2 are substantially parallel to the inner surfaces thereof and are substantially flat, except at the points where the cavities are located which receive various components of the circuit breaker (Figs. 12 and 14). Groove 2o (Fig. 14) in block 2 accommodates a support 16 for a bimetal tripping strip 16a. The lower end 16b of support 16 is fork-shaped (Fig. 11) and engages the waisted end 14a (Fig. 10) of a supporting projection 14b on fixed contact 14. Projection 14b is conductively connected to support 16 as, for instance, by soldering and the lower end of bimetal strip 16a is conductively connected to screw shell terminal contact 19 as, for instance, by conductor 102. Projection 14b has two functions. It forms a terminal for connecting bimetal strip 16a into an electric circuit, and it forms a lock means for blocks 1, 2 across which it projects transversely for maintaining blocks 1, 2 in their abutting position. To this end part 14a is being twisted out of the plane of projecton 14b, thus preventing blocks 1, 2 from separating. Support 13b for fixed contact 13 comprises likewise a waisted end indicated by reference character 13a. Support 13b projects transversely through blocks 1, 2 and its waisted end 13b is being twisted out of the plane of support 13b, thus forming a second locking means for maintaining blocks 1, 2 in their abutting position. The outer end of tripping coil 8 is soldered to support 13 to connect the former into the electric circuit which is controlled by the circuit breaker. The support 16 for the bimetal strip 16a has a U-shaped end 16c, i. e. an end which is bent twice 90 deg. End 16c of support 16 engages two outer lateral surfaces and the top surfaces of blocks 1, 2 and thus forms a third locking means for blocks 1, 2, i. e. one in addition to the two projections 13b, 14b of fixed contacts 13, 14. The aforementioned U-shaped end 11c is received by corresponding recesses in the surfaces of blocks 1, 2. The bimetal strip 16a is arranged at right angles to the general plane of its support 16 and to the planes of the inner abutting surfaces 1a, 2a of blocks 1, 2. Adjusting screw 16d projecting transversely across bimetal strip 16a is adapted to engage tripping armature 7. Armature 7 which, as mentioned above, is pivoted at 6 is adapted to move parallel to the surfaces 1c, 2c of recesses 1b, 2b and is disposed jointly with bimetal strip 16a in the recessed space 2p of block 2. Tripping push button 17 is guided in recess 2q of block 2. Actuating or manual tripping push button 17 is substantially bell-crank-shaped and its lower end 17a engages the armature 7 close to the point 7b where the latter is bent 90 deg. (Figs. 2 and 8). The upper arm of armature 7 is slotted and extends through a slot in spindle 6 and the two tab-like elements 7c resulting from the provision of a slot in the upper arm of armature 7 are bent in opposite directions around spindle 6 (Fig. 8). The lower end of arm 7a of armature 7 may be slightly bent out of the general plane thereof (Fig. 8). By varying this bend as well as the bend at 7b, armature 7 may roughly be adjusted relative to fixed abutment or dog 7d (Fig. 2). Abutment or dog 7d is formed by a screw having a cam-shaped head and is used for effecting a fine adjustment of armature 7. The upper arm of armature 7 is acted upon by a helical biasing and resetting spring 18 arranged in recess 2r of molded block 2.

Each block 1, 2 comprises a substantially cylindrical base portion 1s, 2s which forms in integral part thereof, and projects away from the frame body formed by the upper portions of blocks 1, 2.

Referring now to the process of assembling the above described structure, after all component parts of the snap action operating toggle mechanism 11a to 11f, push button 3, tripping coil 8, magnet core 9 and central terminal contact 10 have been inserted in their respective recesses inside of blocks 1 and 2, and after support 16 of bimetal tripping strip 16a has been mounted in position, supports 13b, 14b of contacts 13, 14 have been inserted into blocks 1, 2 and their ends twisted, springs 15 and 18, spindle 6 and armature 7, tripping push button 17 and switch rod 12 with movable contact 12a assembled in their respective recesses on the outer surfaces of blocks 1, 2, and after all the necessary soldered connections have been established, the prefabricated sub-assembly thus produced may be inserted into a casing provided for receiving that sub-assembly. In the embodiment of the invention shown in Figs. 1 to 15, inclusive, blocks 1, 2 are fitted into a pot-like casing 20 provided with a shoulder portion 20c on which blocks 1, 2 rest. Casing 20 is closed by a hood or cover 21 adapted to maintain blocks 1, 2 in proper position. Casing 20 comprises projection 20d which is tapered on the outside thereof and which is adapted to receive the base portions 1s, 2s of blocks 1, 2. Base portions 1s, 2s and contact 10 project through a hole defined by the bottom end of projection 20d. Screw threaded shell contact 19 is mounted on projection 20d. Contact 19 comprises a radially inner portion 19a in abutting engagement with base portions 1s, 2s. Thus screw threaded shell contact 19 forms an additional locking means for maintaining blocks 1, 2 in abutting engagement. Reference numeral 19b has been applied to indicate an aperture in the bottom end of contact 19 through which parts 1s, 2s project. Casing 20 and cover 21 are provided with internal projections having flat surfaces 20a, 20b, 21a, 21b adapted to maintain parts 6, 7, 12, 15, 17 and 18, which are loosely inserted into blocks 1, 2, in their operational positions without the need of using special fastener means to achieve this end.

In the modification of housing 20 shown in Fig. 16 housing 20 is provided with a pair of internal projections having surfaces 20a, 20b parallel to the surfaces 1a, 1b of blocks 1, 2 which housing 20 is intended to accommodate. The right projection—as seen in Fig. 16—defines a duct 20c in which a piece of sheet iron which bunches the flux of magnet core 9 is arranged.

The embodiment of the invention illustrated in Fig. 17 differs from the embodiments shown in the previous figures and described above in that it includes an insulating member 22 for guiding insulating switch rod 12. Member 22 is supported by a strip 23a, 23b of sheet iron helping to bunch the lines of magnetic force. The bent end 23b of strip 23a, 23b projects into an appropriate recess in block 1. Bent end 23b may also be used to receive screw 100 for securing to it cover 21.

In the embodiment of the invention referring to a base mounted circuit breaker (Figs. 19 to 26) rather than a screw plug type circuit breaker no substantial change in regard to blocks 1, 2 and the elements mounted thereon has been made, except that blocks 1, 2 are generally T-shaped. In order to obtain a large switch or arcing chamber 1q the top wall of the base has been arranged at the level of about half the height of blocks 1, 2 (Fig. 19). Each of the two supports 24 for binding posts 25 is inserted into a groove 2n in block 2 (Figs. 21, 23 and 24) and maintained in position by block 1. The hood-shaped casing 26 is T-shaped in cross-section to conform with the shape of the frame forming blocks 1, 2 which it receives. Casing 26 is provided with two holes 26a for exposing binding posts 25 on the casing insert formed by blocks 1, 2. A metal bar 27 having holes in the ends thereof is arranged in grooves 1t, 2t formed in parts 1, 2 and projects beyond the base of the circuit breaker (Fig. 21). Bar 27 is attached to blocks 1, 2 and makes it possible to secure the circuit breakers to a panel, or the like, without danger of cracking molded blocks 1, 2.

In the modification of the invention shown in Fig. 26 the cap-shaped or hood-shaped casing 26 has been entirely dispensed with, thus significantly decreasing the thickness of the structure. This is achieved by using cover plates 28 for closing the external recesses in blocks 1, 2.

In the embodiments of the invention shown in Figs. 19 to 25 comprising a separate housing 26 the latter is secured to blocks 1, 2 by substantially T-shaped cotter pins 29 inserted into recesses 1u of block 1 (Fig. 19). The outwardly bent ends of cotter pins 29 may be covered by an appropriate insulating cement.

The current path through the embodiment of the invention shown in Figs. 1 to 15 is as follows: Central terminal contact 10, inner end of tripping magnet coil 8, outer end of tripping magnet coil 8, fixed contact 13, movable contact bridge 12a, fixed contact 14, support 16, bimetal strip 16a, and conductor 102 conductively connecting the latter to screw-shell terminal contact 19. The current path through the structure of Figs. 19–25 is similar, binding posts 25 taking the place of terminals 10 and 19.

As mentioned before manual interruption of the circuit is effected by depressing push button 17. The downward movement of the latter is transmitted through armature 7 to pin 6, and the rocking movement of the latter frees latching lever 11a and thus permits collapse of the toggle mechanism and parting of movable contact 12a from fixed contacts 13, 14.

On occurrence of relatively small but protracted overloads abutment 16d on bimetal strip 16a engages armature 7 and moves the latter so near to core 9a that the latter is able to attract armature 7. This causes a collapse of the toggle mechanism and parting of movable contact 12a from fixed contacts 13, 14 in the same way as above described in connection with the manual tripping operation.

On occurrence of major fault currents such as short-circuit currents the magnetic field of core 9 is sufficiently strong to instantly attract armature 7, resulting in instantaneous tripping of the circuit breaker and instantaneous parting of movable contact 12a from fixed contacts 13, 14.

Although there are herein described several forms of structures embodying our invention to illustrate typical circuit breakers in which it may be employed, it should be understood that circuit breakers embodying our invention may be altered considerably from those specifically disclosed without departing from the spirit and scope thereof. Our invention is claimed as follows:

We claim:

1. An automatic circuit-interrupter comprising fixed contacts, cooperating relatively movable contacts, a manual operating mechanism for said movable contacts, excess current responsive trip means for tripping said operating mechanism, a pair of molded insulating blocks arranged in abutting relation, said pair of blocks having pairs of complementary recesses in the abutting surfaces thereof and each of said pair of blocks having additional recesses in the surfaces thereof remote from said abutting surfaces, said fixed contacts, said movable contacts, said operating mechanism and said trip means being arranged in said complementary and in said additional recesses and supported therein by said pair of blocks, and an outer housing accommodating said pair of blocks.

2. An automatic circuit-interrupter comprising fixed contacts, cooperating relatively movable contacts, a manually operable toggle linkage for operating said movable contacts, bimetallic and electromagnetic trip means for tripping said toggle linkage, said electromagnetic trip means including a movable armature and an energizing winding, a pair of molded insulating blocks arranged in abutting relation, said pair of blocks having two pairs of complementary recesses in the abutting surfaces thereof and each of said pair of blocks having additional recesses in the surfaces thereof remote from said abutting surfaces, one of said pair of complementary recesses accommodating said toggle linkage and the other of said pair of complementary recesses accommodating said energizing winding, said additional recesses accommodating said fixed contacts, said movable contacts, said bimetallic trip means and said armature, and lateral wall means for closing said additional recesses.

3. An automatic circuit-interrupter comprising fixed contacts, cooperating relatively movable contacts, a manually operable toggle linkage for operating said movable contacts, excess current responsive trip means for tripping said toggle linkage, a pair of molded insulating blocks arranged in abutting relation, said pair of blocks having pairs of complementary recesses in the abutting surfaces thereof and each of said pair of blocks having additional recesses in the surfaces thereof remote from said abutting surfaces, said fixed contacts, said movable contacts, said toggle linkage and said trip means being arranged in said complementary recesses and in said additional recesses and supported therein by said pair of blocks, fastener means precluding separation of said pair of blocks, said fastener means forming integral parts of said fixed contacts and of said trip means, and outer wall means for closing said additional recesses.

4. An automatic circuit-interrupter comprising a pair of spaced fixed contacts, a cooperating contact bridge movable relative to said pair of contacts, a first push button, a toggle linkage operable by said first push button for moving said contact bridge into engagement with said pair of fixed contacts, electromagnetic trip means for tripping said toggle linkage to cause separation of said contact bridge from said pair of contacts, said trip means including a spring biased substantially bell-crank-shaped pivotally mounted armature, thermal trip means comprising a bimetal strip adapted to act against one arm of said armature to pivot said armature upon bending of said bimetal strip, a second push button adapted to engage the other arm of said armature to pivot said armature upon actuation of said second push button, a pair of molded insulating blocks arranged in abutting relation, said pair of blocks having complementary recesses in the abutting surfaces thereof and each of said pair of blocks having additional recesses in the surfaces thereof remote from said abutting surfaces, said toggle linkage being arranged in said complementary recesses, said fixed contacts, said contact bridge, said armature and said bimetal strip being arranged in and supported by said additional recesses, and an exterior housing providing wall means for closing said additional recesses.

5. An automatic circuit-interrupter comprising a pair of spaced fixed contacts, a movable contact bridge cooperating with said pair of contacts to selectively open and close an electric circuit, a slide member guided along a straight path supporting said contact bridge, a toggle lever operating mechanism for operating said slide member, a push button for operating said toggle lever mechanism, excess current responsive trip means for tripping said toggle lever mechanism, a pair of molded insulating blocks arranged in abutting relation, said pair of blocks having internal recesses in the abutting surfaces thereof and each of said pair of blocks having additional recesses in the surfaces thereof remote from said abutting surfaces, a pair of abutting projections each forming an integral part of one of said pair of blocks, said toggle lever mechanism being arranged in said complementary recesses and said pair of contacts, said contact bridge, said slide member and said trip means being arranged in said additional recesses and supported therein by said pair of blocks, means for mechanically connecting said pair of blocks to form a structural unit, said connecting means including a plug-type screw-shell mounted on said pair of projections, and an outer housing accommodating said pair of blocks but exposing said plug-type screw shell.

6. In an automatic circuit-interrupter the combination of a pair of molded insulating blocks arranged in abutting relation, said pair of blocks having complementary recesses in the abutting surfaces thereof forming a plurality of internal chambers and said pair of blocks having further a plurality of additional recesses in the surfaces thereof remote from said abutting surfaces, a toggle lever operating mechanism arranged in one of said internal chambers, a first push button arranged on one side of said pair of blocks for actuating said toggle lever mechanism, a slide member in one of said additional recesses in one of said pair of blocks movable along a straight path operated by said toggle lever mechanism, a contact bridge supported by said slide member on the end thereof remote from said first push button, a pair of fixed contacts arranged in two of said additional recesses in said one of said pair of blocks cooperating with said contact bridge, and tripping means for said toggle lever mechanism arranged in said additional recesses in the other of said pair of blocks, said tripping means comprising a bimetal strip, a bell-crank-shaped armature adapted to be operated by said bimetal strip, a magnetic core member for attracting said armature, and a second push button adapted to engage said armature to enable manual tripping of said toggle lever mechanism.

7. An automatic circuit interrupter comprising a pair of fixed spaced contacts each having a stud-like support projecting therefrom; a movable contact-bridge adapted to establish a current path between said pair of contacts; a manual operating mechanism for said contact-bridge including a system of links and a push-button for manually operating said system of links; a pair of insulating blocks arranged in abutting relation and defining a cavity therebetween accommodating said system of links and guiding said push-button; said pair of fixed contacts and said contact-bridge being arranged on the outside of one of said pair of blocks in a recessed portion thereof; an operating rod for said contact-bridge operated by said system of links also arranged on said outside of said one of said pair of blocks and guided therein by a straight groove; said stud-like support of each of said pair of contacts projecting transversely through said pair of insulating blocks and fastening together said pair of insulating blocks; thermal and electromagnetic tripping means for said system of links arranged substantially on said outside of said other of said pair of blocks in spaces defined by recesses therein; and plate means covering the outside of said one of said pair of blocks and covering the outside of said other of said pair of blocks.

8. An automatic plug-type circuit interrupter comprising terminal contacts formed by a center contact and by a screw-threaded contact shell; a pair of fixed spaced switching contacts each having a stud-like support projecting therefrom; a movable contact-bridge adapted to establish a current-path between said pair of switching contacts; an operating rod supporting said contact-bridge; a manual operating mechanism for said operating rod, said operating mechanism including a system of links and a push-button for operating said system of links; a pair of insulating blocks arranged in abutting relation and defining a cavity therebetween accommodating said system of links and forming guide surfaces for said push-button; a pair of projections one on each said pair of insulating blocks forming a sleeve for said center contact; said pair of switching contacts and said contact-bridge being arranged on the outside of one of said pair of blocks in a recess provided therein; said operating rod for said contact-bridge being also arranged on said outside of said one of said pair of blocks and guided therein by a straight groove; said stud-like support of each of said pair of contacts projecting transversely through said pair of blocks and fastening together said pair of blocks; overload tripping means for said system of links arranged substantially on the outside of said other of said pair of blocks in spaces defined by recesses therein; a hood-closed pot-shaped housing accommodating said pair of blocks; said screw-threaded contact shell being provided on one end of said housing, and said screw-threaded contact shell having a cut-out portion forming a narrow passage for said pair of projections of said pair of blocks tending to preclude separation of said pair of blocks.

9. In an automatic circuit interrupter the combination of a pair of fixed spaced contacts; a movable contact-bridge adapted to establish a current-path between said pair of contacts; a manual operating mechanism for said contact-bridge including a linkage and a push-button; a pair of molded insulating blocks arranged in abutting relation and defining a cavity therebetween accommodating part of said linkage and forming guiding surfaces for said push-button; overload tripping means for said linkage; said pair of contacts, said contact-bridge and said tripping means being arranged on the outside of said pair of blocks in external recesses provided therein; and plate means for covering said external recesses to preclude access to said pair of contacts, to said contact-bridge and to said tripping means.

10. In an automatic circuit interrupter the combination of a pair of fixed spaced contacts; a movable contact-bridge adapted to establish a current path between said pair of contacts; a manual operating mechanism for said contact bridge, said operating mechanism including a system of toggle-links and a push-button for operating said system of links; a pair of insulating blocks arranged in abutting relation and defining a cavity therebetween accommodating said system of links and forming guide surfaces for said push-button; said pair of fixed contacts and said contact-bridge being arranged on the outside of one of said pair of insulating blocks in a recess formed therein, an operating rod for said contact bridge operated by said system of links also arranged on said outside of said one of said pair of blocks and guided therein by a straight groove; overload tripping means for said operating mechanism arranged substantially on the outside of the other of said pair of blocks in spaces defined by recesses therein; supporting means for said pair of contacts and for said tripping means, said supporting means being adapted to clamp said pair of insulating blocks to each other; and plate means for covering the outside of said one of said pair of blocks and for covering the outside of said other of said pair of blocks to preclude access to said pair of contacts, to said contact-bridge and to said tripping means.

11. In an automatic circuit interrupter the combination of a pair of fixed spaced contacts; a movable contact-bridge adapted to establish a current path between said pair of contacts; a manual operating mechanism for said contact bridge including a linkage and a push-button for manually actuating said linkage; a pair of molded insulating blocks arranged in abutting relation and defining a cavity therebetween accommodating part of said linkage and forming guiding surfaces for said push-button; overload tripping means for said linkage; said pair of contacts, said contact-bridge and said tripping means being arranged on the outside of said pair of blocks in external recesses provided therein; a housing accommodating said pair of blocks; and projections on the inside of said housing partially closing said external recesses to maintain in position the parts arranged therein.

12. In an automatic circuit interrupter the combination of a pair of fixed spaced contacts; a movable contact-bridge adapted to establish a current path between said pair of contacts; a manual operating mechanism for said contact-bridge including a linkage and a push-button for manually actuating said linkage; a pair of molded insulating blocks arranged in abutting relation and defining a cavity therebetween accommodating part of said linkage and forming guiding surfaces for said push-button; overload tripping means for said linkage, said overload tripping means including a bimetallic strip adapted to trip said linkage; a support for said bimetallic strip; said pair of fixed contacts, said contact-bridge and said tripping means being arranged on the outside of said pair of insulating blocks in external recesses provided therein; said support for said bimetallic strip comprising an extension forming a clamp for clamping said pair of blocks to each other; and a housing accommodating said pair of blocks.

13. An automatic circuit interrupter wherein the constituent parts thereof are arranged in three layers separated from each other by insulating wall means, said circuit interrupter comprising in combination a central layer including an operating toggle linkage and a push-button for manual operation of said linkage; a first outside layer comprising thermal and electromagnetic overload tripping means for tripping said linkage in response to excessive currents; a second outside layer comprising a pair of spaced fixed contacts, a movable contact-bridge adapted to establish a current-path between said pair of contacts, and an operating rod for said contact-bridge adapted to be operated by said push-button by the intermediary of said linkage; a first insulating barrier having recesses on the inside thereof and on the outside thereof interposed between said central layer and said first outside layer; a second insulating barrier having recesses on the inside thereof and on the outside thereof interposed between said central layer and said second outside layer; fastener means projecting transversely across said first barrier and across said second barrier to attach said first barrier to said second barrier; and a housing accommodating said central layer, said first outside layer, said second outside layer, said first barrier, and said second barrier.

14. An automatic circuit interrupter wherein the constituent parts thereof are arranged in three layers substantially separated from each other by insulating wall means, said circuit interrupter comprising in combination a central layer including parts of an operating linkage, a push-button for manual operation of said linkage and an electromagnet winding for energizing overload trip means; a first outside layer comprising a substantially bell-crank-shaped armature adapted to be controlled by a magnetic field established by said electromagnet winding and a bimetallic strip adapted to act upon said armature to move said armature inside of said magnetic field; a second outside layer comprising a pair of spaced fixed contacts, a movable contact-bridge adapted to establish a current-path between said pair of contacts an operating rod for said contact-bridge adapted to be operated by said push-button by the intermediary of said linkage; a first insulating barrier being recessed on the inside thereof and being recessed on the outside thereof interposed between said central layer and said first outside layer; a second insulating barrier being recessed on the inside thereof and being recessed on the outside thereof interposed between said central layer and said second outside layer; a magnetic core arranged inside said electromagnet winding and a pin supporting said armature, both said core and said pin being arranged at right angles to said first barrier and projecting transversely across said first barrier from the zone of said central layer into the zone of said first layer; a pin operated by said operating linkage arranged at right angles to said second barrier and projecting transversely through a slot in said second barrier into said operating rod for said contact-bridge; fastener means projecting transversely across said first barrier and across said second barrier to attach said first barrier to said second barrier; and a housing accommodating said central layer, said first outside layer, said second outside layer, said first barrier, and said second barrier.

15. In an automatic circuit interrupter the combination of a pair of fixed contacts; a movable contact-bridge adapted to establish a current-path between said pair of contacts; a manual operating mechanism for said contact bridge, said mechanism including an operating rod supporting said contact-bridge, linkage means for operating said rod and a push-button for manual operation of said linkage means; a pair of molded insulating blocks arranged in abutting relation and defining a cavity therebetween accommodating said linkage means and forming guiding surfaces for said push-button; an electromagnet for energizing overload trip means comprising a core projecting transversely through one of said pair of blocks and a coil mounted on said core and accommodated in said cavity; electromagnetic overload trip means for said operating mechanism, said trip means including an armature under the action of the magnetism established in said core, said armature being arranged in an external recess provided in one of said pair of blocks and hingedly supported by a pin projecting transversely across said one of said pair of blocks into said cavity between said pair of blocks; said pair of fixed contacts, said contact-bridge and said operating rod being arranged in external recesses provided in the other of said pair of blocks; a pin for attaching said operating rod to said linkage means; and a slot in said other of said pair of blocks for the passage of said pin.

16. An automatic circuit interrupter as specified in claim 15 comprising a housing receiving said pair of blocks and a strip of magnetic material supported on the inside of said housing for bunching the magnetic flux established by said core.

17. In an automatic circuit interrupter the combination of a pair of fixed spaced contacts; a movable contact-bridge adapted to establish a current-path between said pair of contacts; an operating rod for operating said contact bridge; a system of links for operating said operating rod and a connecting pin for securing said operating rod to said system of links; a push-button for operating said system of links; a pair of substantially T-shaped insulating shells each comprising a transverse portion and a longitudinal portion, said pair of shells being arranged in abutting relation outwardly bounding an internal cavity formed therebetween; said system of links being arranged in said cavity; external recesses in the outer surfaces of each of said pair of shells; tripping means for tripping said system of links arranged in said external recesses in one of said pair of shells; said pair of contacts and said contact-bridge being arranged in one of said external recesses situated in said transverse portion of the other of said pair of shells, said operating rod being slidably arranged in one of said external recesses situated in said longitudinal portion of said other of said pair of shells; and said other of said pair of shells defining a longitudinal slot for the passage of said connecting pin from said system of links to said operating rod.

18. In a tripping arrangement for a circuit breaker the combination of a spring-biased operating linkage mechanism; a pivotally supported latching pin adapted to latch said linkage mechanism, said latching pin being also adapted upon pivotal movement thereof to release said linkage mechanism; a slot extending transversely across said latching pin; a substantially bell-crank-shaped armature having two arms; means for establishing a magnetic field acting upon one arm of said armature; the other arm of said armature being inserted into said slot in said latching pin and secured to said latching pin by being bent around said latching pin.

19. In a tripping arrangement for a circuit breaker the combination of a spring-biased operating linkage mechanism; a pivotally supported latching pin adapted to latch said linkage mechanism, said latching pin being also adapted upon pivotal movement thereof to release said linkage mechanism; a substantially bell-crank-shaped armature comprising two arms and pivotally supported by said latching pin; a manually operable push-button adapted to act upon one of said arms of said armature to pivot said latching pin; means for establishing a magnetic field acting upon the other of said arms of said armature tending to pivot said latching pin; and a bimetallic strip adapted to act upon said other of said arms of said armature to move said armature inside said magnetic field.

References Cited in the file of this patent

UNITED STATES PATENTS

| Re. 23,971 | Ingwersen | Mar. 29, 1955 |
| 2,134,593 | Wulsten | Oct. 25, 1938 |
| 2,141,749 | Hauser | Dec. 27, 1938 |
| 2,612,575 | Ondrejca et al. | Sept. 30, 1952 |
| 2,647,191 | Humpage | July 28, 1953 |
| 2,700,713 | Cole et al. | Jan. 25, 1955 |
| 2,732,455 | Ericson et al. | Jan. 24, 1956 |

FOREIGN PATENTS

| 900,924 | France | Oct. 23, 1944 |
| 906,805 | France | May 28, 1945 |